United States Patent [19]
Church et al.

[11] 3,935,489
[45] Jan. 27, 1976

[54] DYNAMOELECTRIC MACHINE HAVING IMPROVED VIBRATION ISOLATION AND THRUST SYSTEM

[75] Inventors: Ralph E. Church, Fort Wayne, Ind.; Daniel L. Beckman, Jonesboro, Ark.

[73] Assignee: General Electric Company, Fort Wayne, Ind.

[22] Filed: Apr. 24, 1974

[21] Appl. No.: 463,560

[52] U.S. Cl............................ 310/90; 308/163
[51] Int. Cl.² ................................... H02K 5/16
[58] Field of Search ....... 310/51, 49, 162, 163, 164, 310/90, 89, 91, 172; 308/163, 36.2; 29/474.4; 184/1 D, 6.27; 264/135, 262, 263, 324; 277/165; 425/127, 128

[56] References Cited
UNITED STATES PATENTS

| | | | |
|---|---|---|---|
| 2,078,783 | 4/1937 | Welch | 308/36.2 |
| 2,912,290 | 10/1959 | Shaffer | 308/163 |
| 2,958,908 | 11/1960 | Thompson | 308/163 |
| 3,002,794 | 10/1961 | Bluemink | 310/90 |
| 3,024,377 | 3/1962 | Tupper | 310/172 |
| 3,500,087 | 3/1970 | Wendt | 310/90 |
| 3,705,752 | 12/1972 | Ott | 310/90 |
| 3,720,852 | 3/1973 | Vieweg | 310/90 |
| 3,743,871 | 7/1973 | Church | 310/90 |
| 3,749,954 | 7/1973 | Anderson | 310/90 |
| 3,786,290 | 1/1974 | Pabst | 310/90 |

*Primary Examiner*—R. Skudy
*Attorney, Agent, or Firm*—Ralph E. Krisher, Jr.

[57] ABSTRACT

Dynamoelectric machine stator, rotor assembly including a shaft; member for supporting a bearing; lubricant reservoir cover; and relatively flexible thrust plate that provides a thrust bearing surface spaced from a wall of the cover to avoid a hard, sound transmitting connection between such shaft and wall. During axial excursions of shaft, thrust plate flexes to absorb thrust associated with such excursions. Skeleton type motor is illustrated wherein flexible thrust plate and vibration isolating member is interposed between the opposite pulley end of shaft and wall of oil reservoir cap or cover. Structure for spacing establishes predetermined minimum spacing between facing surfaces of wall and thrust plate.

4 Claims, 8 Drawing Figures

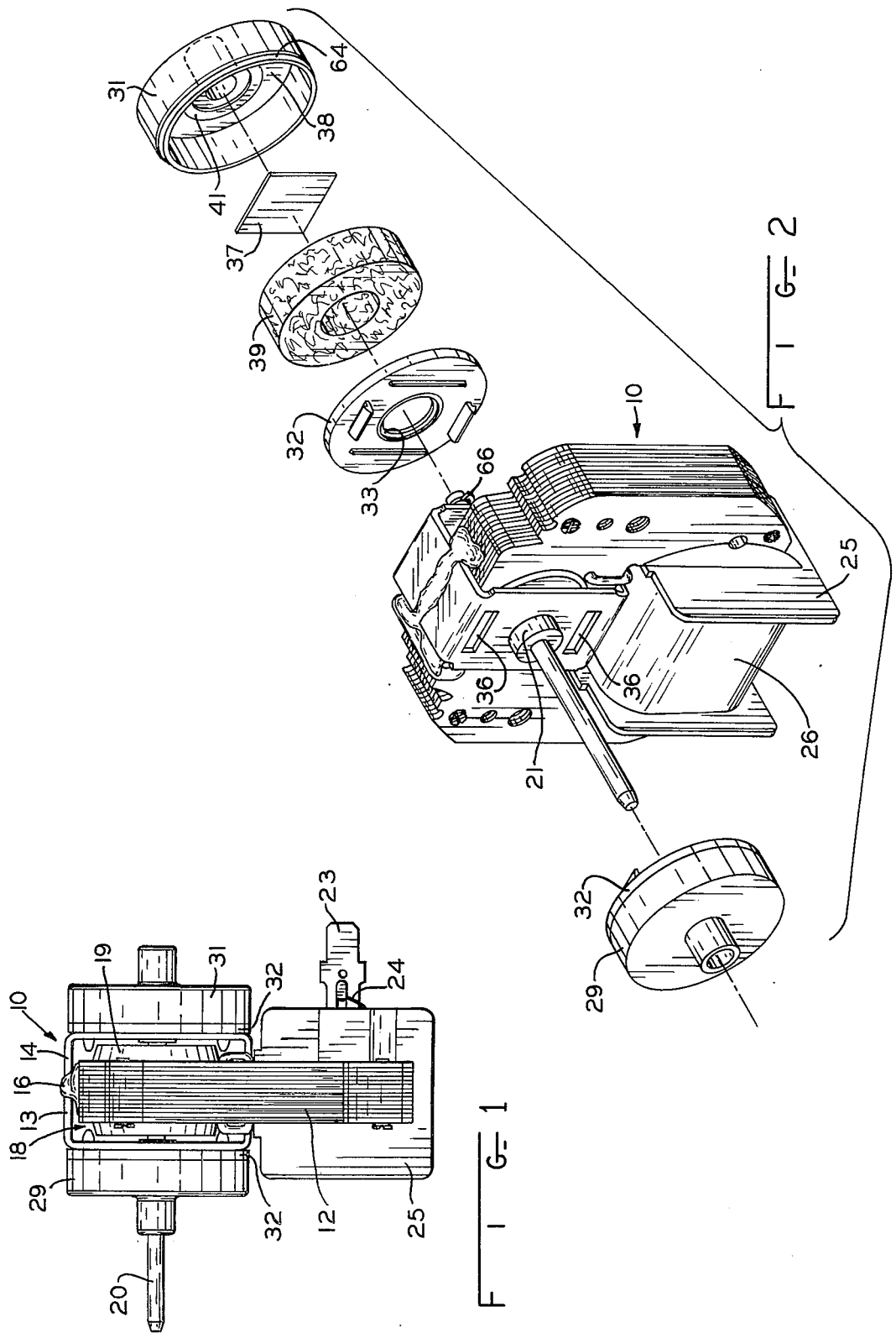

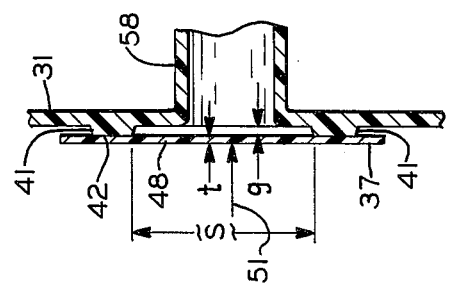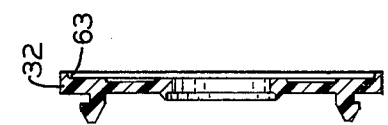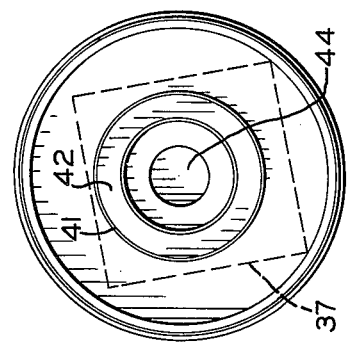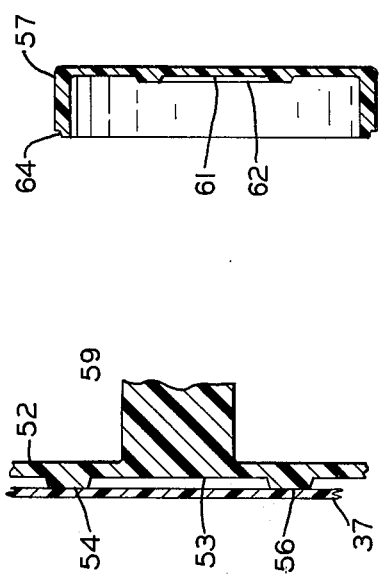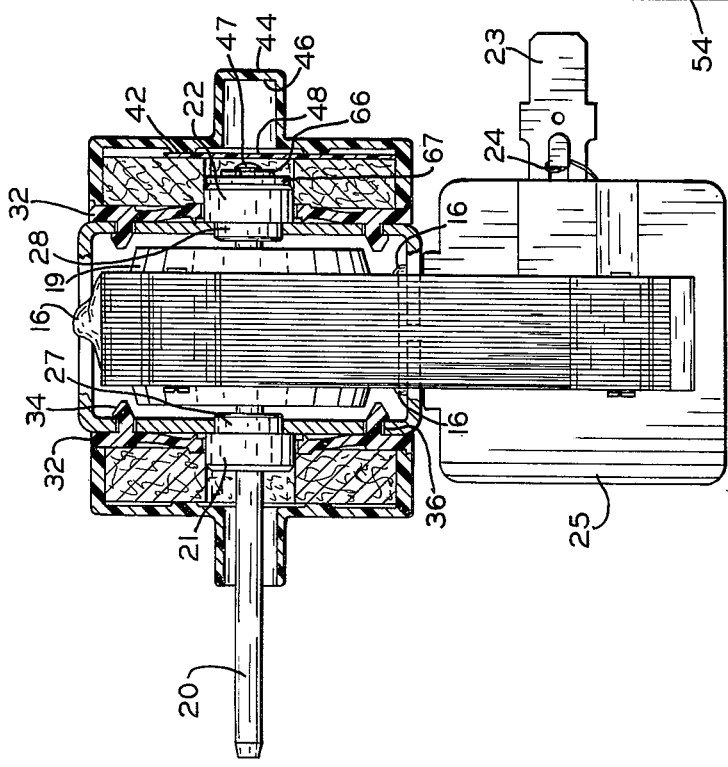

DYNAMOELECTRIC MACHINE HAVING IMPROVED VIBRATION ISOLATION AND THRUST SYSTEM

BACKGROUND OF THE INVENTION

The present invention relates generally to dynamoelectric machines and, more particularly, to fractional horsepower motors having means for isolating vibrations caused by axial movement of a shaft and for providing a thrust bearing surface for such shaft.

The fractional horsepower electric motor art is relatively well developed and a need has been long recognized for limiting the end play of a rotatable shaft. The Thompson et al. U.S. Pat. No. 2,958,908 and Shaffer U.S. Pat. No. 2,912,290 (both of which are assigned to the assignee of the present invention) are indicative of two approaches that have been used hereinbefore and wherein a resilient member is utilized to determine or limit the end play of a rotatable shaft.

In one approach, as shown for example in Church U.S. Pat. No. 3,743,871 (which is assigned to the assignee of the present invention), shaft end play toward the pulley end of the shaft is controlled by a split locking ring that bears against a thrust washer that is sandwiched between the split ring and a sleeve type bearing. End play toward the opposite pulley end of the shaft may be limited by the shaft striking and bearing against the back wall of a lubricant reservoir.

With particular reference to U.S. Pat. No. 3,743,871, it is noted that for at least more than a year prior to the filing date of the present application, a flat thrust plate has been interposed between the interior back wall of an oil reservoir cover and the opposite pulley end of the shaft. Such plates have been formed of materials having suitable antifriction properties, one example of which is a material sold under the name NYLATRON by the Polymer Corporation of Reading, Pa.

While constructions of this type have provided a satisfactory thrust system in terms of limiting shaft end play and providing satisfactory motor life, we have now determined that objectionable noise levels sometimes exist during operation of such motors. The more objectionable noise emanating from such motors typically has a frequency of about 50 cycles per second and of about 120 cycles per second as a result of shaft pulsations. The frequency of these pulsations is in fact a function of the power supply frequency.

Motors of the particular type illustrated in the above referenced Church patent and in Wendt U.S. Pat. No. 3,500,087 are of a type frequently referred to as a "skeleton" or "side coil" type motor. Motors of this type frequently are found in household appliances of those types where any hidden source of noise may be particularly objectionable. For example, even though the noise generated by such motor is not necessarily indicative of a malfunction, or impending motor or appliance failure; the purchaser of a new household appliance may become concerned about such noises.

For example, motors of the skeleton type are often used to circulate air within the food storage compartment of household refrigerators. If a 50 cycle or 120 cycle noise became audible when the door to such compartment was opened, undue alarm on the part of the refrigerator owner might result.

It will be understood that similar situations can result when motors are applied to other end uses and, accordingly, it would be generally desirable to provide new and improved electric motors that would retain the proven performance and reliability characteristics of existing motor designs but, in which, noise caused by motor shaft excursions may be substantially reduced, if not eliminated.

Accordingly, it is an object of the present invention to provide new and improved dynamoelectric machines having improved vibration isolation and thrust bearing systems.

It is a more specific object of the present invention to provide such motors wherein the complexity of the motor is not increased and wherein existing production methods and equipment may continue to be utilized.

It is a still more specific object of the present invention to provide new and improved subfractional horsepower skeleton type motors having an end thrust and noise isolating plate that is substantially isolated from a noise transmitting wall of an oil reservoir cover.

SUMMARY OF THE INVENTION

In carrying out the above and other objects of the present invention in one specific preferred form, we provide a dynamoelectric machine stator, rotor assembly including a shaft; a member for supporting a bearing; a lubricant reservoir cover; and a relatively flexible thrust or cushion plate that provides a thrust bearing surface and that is spaced from a wall of the cover so that a hard, sound transmitting connection between the end of the shaft and such wall is avoided. During axial excursions of a shaft toward such wall, the thrust plate flexes to absorb the thrust associated with such excursions.

In an illustrated form, the invention is embodied in a skeleton type motor wherein a flexible thrust plate and vibration isolating member is interposed between the opposite pulley end of a shaft and a wall of an oil reservoir defining cap or cover. Spacer means are provided which establish a predetermined minimum spacing between such wall and the facing surface of the thrust plate.

The subject matter which we regard as our invention is particularly pointed out and distinctly claimed in the concluding portion of this specification. Our invention itself, however, both as to its organization and mode of operation, together with further objects and advantages thereof may best be understood by reference to the following description taken in connection with the accompanying drawing.

BRIEF DESCRIPTION OF THE DRAWINGS

FIG. 1 is a side elevation of an electric motor embodying the present invention in one form thereof;

FIG. 2 is an exploded, perspective view of the structure of FIG. 1;

FIG. 3 is a side elevation of the structure of FIG. 1, to a somewhat larger scale than FIG. 1, and with parts in section and parts broken away;

FIG. 4 is a view looking into part of an oil reservoir cover;

FIG. 5 is an enlarged side elevation cross-sectional view of part of the structure of FIG. 3, and includes part of a thrust plate;

FIG. 6 is a view somewhat similar to FIG. 5 but showing a modified type of cover;

FIG. 7 is a cross-sectional side elevation of yet another modified cover; and

FIG. 8 is a cross-sectional side elevation of a cover closing and mounting member that is also shown in

FIGS. 1–3.

DESCRIPTION OF THE PREFERRED EMBODIMENTS

Referring now in more detail to the drawings, there is shown in FIG. 1 an electric induction motor 10 of the shaded pole, skeleton type embodying one form of the present invention. The motor includes a stator assembly 11 that comprises, inter alia, a stator core 12 and a pair of end frames 13, 14. The end frames may be secured to the core in any suitable fashion but, for purposes of illustration, the frames 13 and 14 are shown as being connected to the core 12 by means of a structural adhesive material 16. The structural adhesive material 16 may be, for example, any suitable material, such as an epoxy adhesive. More detailed descriptions of this type of construction are presented in Tupper U.S. Pat. No. 3,024,377.

A rotor assembly 18 includes a conventional squirrel cage rotor body 19 and shaft 20. The shaft 20 is journaled for rotation in a pair of spaced apart sleeve bearings 21, 22 that in turn are supported by the end frames 13, 14. FIG. 3 best illustrates the pair of sleeve bearings 21, 22 and their relationship to the shaft and end frame.

The rotor assembly 18 rotates relative to the stator core 12 when a coil that is wound about a leg of the stator core is energized. A pair of spade type terminals 23 are connected to ends 24 of the winding coil so as to facilitate energization of the motor 10 from any suitable alternating voltage source. The wound coil is wound about an insulating coil support 25 and the relationship of the coil support and wound coil will be best appreciated from a review of FIG. 2, although the individual turns of the wound coil are covered by a piece of insulating tape 26.

It is to be understood that the details of construction just referred to have been commercially used for more than a year prior to the filing date of this application. Moreover, such details are now known in the art because of publications such as Church U.S. Pat. No. 3,709,457; Church U.S. Pat. No. 3,743,871; Baclawski U.S. Pat. No. 3,243,619; and Wendt U.S. Pat. No. 3,500,087 (all of which are assigned to the assignee of the present invention). Thus, many of the specific details mentioned herein are provided only for purposes of illustration and description, and such details are not to be construed as limiting features of the present invention.

The bearings 21, 22 preferably comprise controlled porosity sintered material sleeve bearings each of which have one end of reduced diameter (see FIG. 3) positioned within a bearing receiving hole 27, 28 of the end frames. The end frames themselves may be of any desired shape or form but have been illustrated as being generally U-shaped brackets formed of light weight aluminum structural material. Preferably, the ends of the sleeve bearings 21, 22 are staked or swedged to the end frames in the area of the holes 27, 28. The position of the end frames, prior to curing the adhesive material 16, is preferably such that the bearings are aligned so that a desirable concentric and uniform air gap is established between the rotor and bore of the stator, all as will be understood by persons of ordinary skill in the art.

In the case of motor 10, the bearing lubrication system includes a pair of plastic reservoir covers 29, 31. While any suitable material may be utilized to make the covers, polycarbonate material marketed by the General Electric Company under the name LEXAN was utilized in the actual fabrication of the covers 29, 31. It is to be understood, however, that the covers could be made of a metallic material as taught in the above referenced Baclawski U.S. Pat. No. 3,243,619 for example. Moreover, the covers could be relatively simple one piece arrangements of the type shown and described in Church U.S. Pat. No. 3,743,871. The illustrated reservoirs are each made up of a cover, and a mounting and closing plate or member 32 that has a centrally located bearing admitting aperture 33 formed therein. The mounting plates are provided with a plurality of hooking or latching members 34 that are each accommodated by a slot 36 in an end frame.

In a preferred mode of assembly of the illustrated reservoirs, a flexible thrust plate 37 is loosely positioned adjacent to an interior end wall 38 of the cover. Lubricant retaining material such as a felt ring 39 is thereafter placed in the cover over the plate 37. The lubricant retaining material is provided to retain a lubricant, such as oil, that is subsequently fed to the bearings during operation of the motor 10. Moreover, the felt 39 may be replaced with other lubricant retaining materials, e.g., those of the extrudable type or grease types. After placement of the plate 37 and lubricant retaining material in the cover 31, the plate 32 is positioned proximate to the cover and the plate and cover may subsequently be ultrasonically welded together; spin welded; or fastened by any other suitable means. It is emphasized that the plate 32 may be dispensed with and mounting means may be provided on the cover 31, so that a one piece cover, for example, one similar to the cover shown in Church U.S. Pat. No. 3,743,871, may be used. However, it still will be desirable to provide a flexible plate 37 that is spaced in a predetermined manner from the rear wall of such cover.

In the preferred embodiments, we have provided spacer means that establish a secondary surface 42 along a ridge 41. The surface 42 of the illustrated spacer means is spaced at least a minimum predetermined distance from an end wall 44 of the cover 31. However, any other suitable spacer means may be used to establish a free span for plate 37 across a preselected central region of the cover.

With reference to FIGS. 3 and 4, the end wall 44 establishes a first interior surface region 46 that is substantially coaxial with the opposite pulley end 47 of the shaft 20. It also will be noted from FIGS. 3 and 4 that a predetermined portion 48 of the plate 37 is disposed between this first interior surface region 46 and the end 47 of the shaft. This first predetermined portion 48 of the plate 37 establishes a clear, unsupported span across the annular surface 42. The plate 37 is fabricated from a flexible material that preferably has low friction characteristics. During operation of the motor 10, end thrust may cause the shaft 20 to move to the right as shown in FIG. 3 so that the opposite pulley end 47 of the shaft bears against the predetermined region 48 of the plate 37. This portion of plate 37 then provides a thrust bearing surface.

Although different materials will readily suggest themselves for use as the plate 37, we have determined that a relatively thin piece of plastic material sold under the name NYLATRON by the Polymer Corporation is entirely suitable for use in the practice of the present invention. Accordingly, this is the material that was utilized to make the plate 37. The spacer means are provided to establish a desired predetermined minimum spacing between the facing surfaces of the thrust plate 37 and the corresponding facing interior surface region of the wall of the cover that is in generally colinear relationship with the shaft 20.

In one specific exemplification of the invention as illustrated in FIG. 3, the thrust plate was formed of the aforementioned NYLATRON material and had a thickness of about 0.015 of an inch. This dimension is indicated by the dimension $t$ in FIG. 5. The surface 42 was positioned relative to the rear wall of the cover so that a minimum gap was established. In FIG. 5, one such gap is denoted by the reference letter $g$, and in actual reductions to practice, gap $g$ was about 0.015 of an inch. The unsupported span S on the other hand was about 0.40 inches. These dimensions are preselected so that during normal operation of the motor the thrust plate 48 will deflect a sufficient amount to withstand axial thrust loading, and yet not contact or bottom out on the interior surface region of the cover.

For many fan applications, with air moving from the right to the left as viewed in FIG. 3, the shaft 20 will be urged toward the thrust plate 37 with a thrust of from about 5 to 8 ounces. For thrust loads in this range, we have determined that the spacer plate 37 will be deflected along the direction illustrated by arrow 51 about 0.005 of an inch. Thus, the thrust or cushion plate does not engage the interior surface 46 of the cover 31, and vibrations are not transmitted directly through the plate 37 to the rear wall of the cover 31. Deflection of plate 37, in response to a thrust force applied along arrow 51, is a function of: the applied force; thickness of plate 37; and the span S. Actual calculations (once a given material is selected) of the deflection of plate 37 may be made by following the engineering relationship of:

$$Y = \frac{a^2 W}{t^3} C;$$

where $Y$ is deflection in inches; $a$ is the radius (in inches) of the spring section of the plate or one-half of S in FIG. 5; $t$ is the thickness (in inches) of the spring section measured in the direction of deflection; and $W$ is the force (in pounds) applied to the center of the plate 37. $C$, on the other hand, will be a constant for a given design and material, and may be determined empirically or from various texts which would identify $C$ in terms of: the modulus of elasticity of the material ($575 \times 10^3$ psi for the material of plate 37); Poisson's ratio for the material (0.4 for the material of plate 37); and the constant $\pi$. One such text indicates that $C$ would be equal to:

$$\frac{\frac{3(m-1)}{(3m+1)}}{4\pi E m^2};$$

where $m$ is the reciprocal of Poisson's ratio and $E$ is the modulus of elasticity.

The above or similar engineering relationships may be used to determine a minimum spacing between a flexible plate such as plate 37 and an end wall that faces such plate.

During assembly of an impeller or fan blade to the free end of the shaft 20, such impellers are frequently pressed on to the shaft. When this is done, substantial forces may be applied to the shaft 20 in an axial direction that results in the opposite pulley end 47 of the shaft bearing against the plate 37 with a substantial force. If this force is sufficiently great, the plate 37 may be deflected so much that the plate either will be cracked or broken, or that the elastic limit of the plate will be exceeded with the result that the plate will elongate or deform and thereafter contact the rear wall of the cover during normal operation of the motor 10. If this were to occur, noise associated with axial excursions of shaft 20 during normal operation would be transmitted to the rear wall of the cover 31 and objectionable noise levels would emanate from the motor. This problem, in effect, establishes a maximum upper limit for the free distance between the plate 37 and the adjacent wall of cover 31. The actual upper limit is better determined by flexing a given plate, measuring the maximum deflection before permanent damage occurs, and then designing a cover and spacing means so that the plate cannot be deflected more than the predetermined safe amount.

Thus, a more preferred construction is illustrated by FIG. 6 as compared to FIG. 5.

In FIG. 6, a cover 52 has been illustrated which is substantially identical to the cover 31 with the exception that the first interior surface region 53 thereof is spaced sufficiently close to the plate 37 so that the plate 37 will bottom out against the interior surface region 53 during assembly of an impeller with shaft 20 and plate 37 will not be permanently deformed or damaged.

When the excessive force associated with assembly of an impeller to shaft 20 is removed from the shaft; the plate 37 will return to its free position illustrated in FIG. 6 and thereafter operate as both a thrust bearing and means that isolates the rear wall of cover 52 from the direct transmission of noise thereto. Thus, substantially no noise will result from axial excursions of a shaft during motor operation. It will be noted that the cover 52 is also provided with spacer means 54 that corresponds identically to the spacer means 41 illustrated in FIGS. 4 and 5.

FIG. 7 illustrates still another modification of a cover 57 that may be used in lieu of either of the covers 31 or 52. The covers 31 and 52 are provided with hubs 58, 59, respectively, that may accommodate a resilient ring that then is used to resiliently mount a motor. The cover 57, on the other hand, would be used for applications where studs or screws are used to interconnect the stator core with a suitable motor mounting device or structure.

The cover 57 is provided with a back wall that includes a first interior surface region 61, and a generally circular surface 62 that provides means for spacing a flexible plate 37 from the surface region 61 of the cover. It should be noted, however, that spaced apart pads or lugs may be utilized rather than a continuous annular surface to provide the desired spacing between a plate 37 and the rear wall of a cover. Moreover, if the plate 37 were to be stamped from sheet material having suitable properties and characteristics, lugs or spacing feet could be formed from such plate to establish the desired spacing means.

When covers such as covers 31, 57, and 52 are not provided with axially extending hooks or other means by which such covers are to be fastened to the motor; the cap or plate 32 (as shown in FIGS. 8 and 2) may be utilized. A contoured lip 63 on cap 32 fits over a groove or notch 64 formed in the covers. Thereafter the caps 32 and covers may be secured together as hereinabove mentioned.

Although it is not critical to an understanding of the present invention, it is noted that means also are provided in the motor 10 for preventing excessive movement of the shaft 20 toward the left as viewed in FIG. 3. These means are provided in the form of a not shown groove adjacent to the end 47 of the shaft and in which a split ring 66 is carried. Interposed between the split ring 66 and the end face of the bearing 22 is a NYLATRON or other suitable material washer 67. Thus, the motor 10 is provided with thrust means that limit axial excursions of the rotor shaft 20 in both axial directions.

It should be realized by those skilled in the art that the benefits that may be derived from use of the present invention are applicable to motors other than the type illustrated herein and that various changes may be made without departing from the spirit and scope of the invention.

Accordingly, while in accordance with the Patent Statutes, we have described what at present are considered to be preferred embodiments of the invention, it will be obvious to those skilled in the art that numerous other changes and modifications may be made therein without departing from the invention. It is therefore aimed in the appended claims to cover all such equivalent variations as fall within the true spirit and scope of the invention.

What we claim at new and desire to secure by Letters Patent of the United States is:

1. In an electric motor having a stator, a shaft having a rotor fixed thereto, a frame member carrying at least one bearing for supporting the rotor shaft for rotation about the longitudinal axis of the shaft movement relative to the stator, and a cover carried by the frame member for establishing at least one boundary of a lubricant reservoir, the improvement comprising: said cover having a centrally disposed first interior surface region spaced a first predetermined distance from the frame, and further having secondary surface means located about the centrally disposed interior surface region with the secondary surface means being axially displaced, relative to the first interior surface region, in a direction toward the end frame; said shaft having an end disposed within the lubricant reservoir and spaced from the first interior surface region; and the improvement further comprising a flexible thrust plate having at least a portion thereof spanning the first interior surface region to provide a flexible abutment for the shaft end disposed within the lubricant reservoir said portion being spaced from the first interior surface region and said portion establishing an unsupported span that is flexibly deflectable toward the first interior surface region in response to axially directed thrust loads applied thereto by the end of the rotor shaft.

2. In an electric motor having a stator, a rotor assembly including a rotatable shaft journalled in at least one bearing supported in predetermined relationship to said stator, and a cover supported in fixed stationary relationship with the stator and having an end wall disposed in covering relationship with an end of the shaft and at least part of the at least one bearing, the improvement comprising: a flexible thrust plate having a portion disposed within the stationary cover between the end of the rotatable shaft and the cover end wall, and spacer means disposed between the thrust plate and the cover end wall for holding said portion in spaced relation to the cover end wall; said portion and cover end wall being spaced apart a predetermined amount so that contact between said portion and the cover end wall is prevented during axial excursions of the shaft end toward the cover end wall during normal operation of the motor; said portion of the flexible thrust plate being spaced from the cover end wall, said portion establishing an unsupported span that is flexibly deflectable toward the cover end wall in response to axially directed thrust loads applied thereto by the end of the shaft.

3. The invention of claim 2 wherein said portion of the flexible thrust plate establishes an axially extending air gap between said portion and the cover end wall; said portion having a predetermined span between two spaced apart regions in contact with the spacer means, and said portion having a predetermined thickness; the axially extending air gap being, when the thrust plate is in an unstressed condition, at least a minimum distance that is proportional to the second power of the predetermined span and inversely proportional to the third power of the predetermined thickness.

4. The invention of claim 2 wherein the plate is a plastic material and is spaced from said wall a distance less than the distance that the material must be deflected in order to permanently damage the plate.

* * * * *